United States Patent
Numata

(10) Patent No.: US 12,328,512 B2
(45) Date of Patent: Jun. 10, 2025

(54) IMAGE CAPTURING APPARATUS AND MONITORING SYSTEM

(71) Applicant: CANON KABUSHIKI KAISHA, Tokyo (JP)

(72) Inventor: Aihiko Numata, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 132 days.

(21) Appl. No.: 18/455,226

(22) Filed: Aug. 24, 2023

(65) Prior Publication Data

US 2023/0403473 A1    Dec. 14, 2023

Related U.S. Application Data

(63) Continuation of application No. PCT/JP2022/004174, filed on Feb. 3, 2022.

(30) Foreign Application Priority Data

Feb. 25, 2021 (JP) .................... 2021-028712

(51) Int. Cl.
H04N 23/73 (2023.01)
H04N 23/661 (2023.01)
H04N 23/667 (2023.01)
H04N 23/67 (2023.01)

(52) U.S. Cl.
CPC .......... *H04N 23/73* (2023.01); *H04N 23/667* (2023.01); *H04N 23/673* (2023.01); *H04N 23/661* (2023.01)

(58) Field of Classification Search
CPC .... H04N 23/73; H04N 23/667; H04N 23/673; H04N 23/661; H04N 23/71; H04N 23/76; G02B 7/36; G03B 7/093; G03B 13/36
See application file for complete search history.

(56) References Cited

U.S. PATENT DOCUMENTS

| | | | | |
|---|---|---|---|---|
| 9,319,594 B2* | 4/2016 | Iwasaki | .................. | H04N 23/73 |
| 2017/0142313 A1* | 5/2017 | Gren | ..................... | H04N 25/75 |
| 2017/0366729 A1* | 12/2017 | Itoh | ........................ | H04N 23/82 |

FOREIGN PATENT DOCUMENTS

| | | |
|---|---|---|
| JP | 2010136205 A | 6/2010 |
| WO | 2017/057494 A1 | 4/2017 |
| WO | 2017/170717 A1 | 10/2017 |

* cited by examiner

*Primary Examiner* — Shahbaz Nazrul

(74) *Attorney, Agent, or Firm* — Canon U.S.A., Inc. IP Division

(57) ABSTRACT

An image capturing apparatus includes an image sensor that controls an exposure time for each of a plurality of areas and sets an exposure time, based on luminance information for each of the plurality of areas in an image captured by the image sensor, and one or more processors that execute instructions comprising determining whether an autofocus mode for adjusting a focus position of an imaging optical system using a contrast evaluation value within an evaluation frame set for the image is enabled, wherein the exposure time is determined for each of the plurality of areas so that, within the evaluation frame, a variance of exposure times of the plurality of areas in a case where the autofocus mode is enabled is smaller than a variance of exposure times of the plurality of areas in a case where the autofocus mode is disabled.

15 Claims, 7 Drawing Sheets

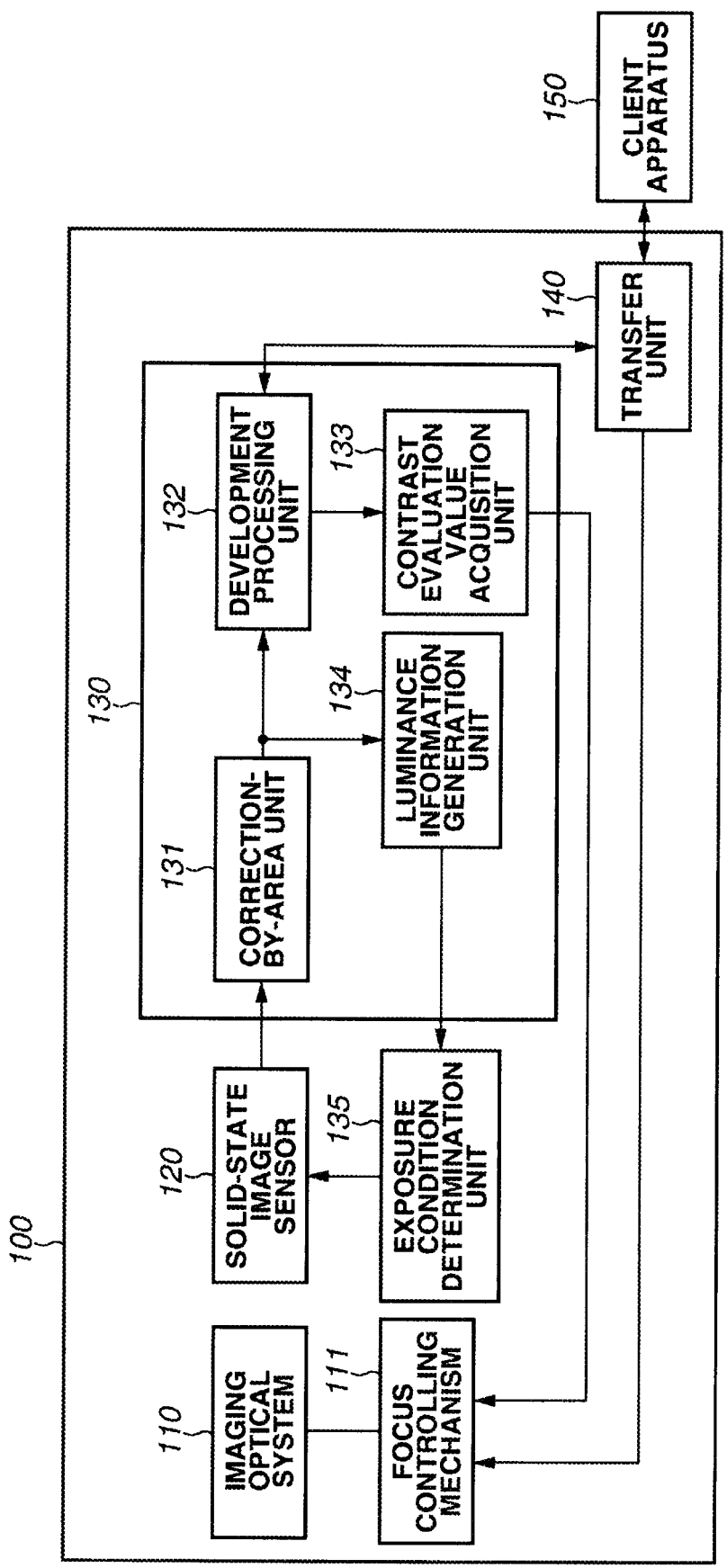

FIG.5

CASE WHERE DIFFERENCE IN EXPOSURE IN IMAGE CAPTURING MODE IS PROVIDED AS DIFFERENCE IN EXPOSURE TIME, AND EXPOSURE TIMES ARE MADE IDENTICAL IN AF MODE

|  | AREA 161 (EV4) | AREA 162 (EV0) |
|---|---|---|
| IMAGE CAPTURING MODE | TV 4  SV 0 | TV 0  SV 0 |
| AF MODE | TV 0  SV 0 | TV 0  SV 0 |

CASE WHERE DIFFERENCE IN EXPOSURE IN IMAGE CAPTURING MODE IS PROVIDED AS DIFFERENCE AS DIFFERENCE IN GAIN, AND GAINS ARE MADE IDENTICAL IN AF MODE

|  | AREA 161 (EV4) | AREA 162 (EV0) |
|---|---|---|
| IMAGE CAPTURING MODE | TV 0  SV 4 | TV 0  SV 0 |
| AF MODE | TV 0  SV 0 | TV 0  SV 0 |

CASE WHERE DIFFERENCE IN EXPOSURE IN IMAGE CAPTURING MODE IS PROVIDED AS DIFFERENCE IN EXPOSURE TIME, AND DIFFERENCE IN EXPOSURE TIME IS REDUCED IN AF MODE

|  | AREA 161 (EV10) | AREA 162 (EV0) |
|---|---|---|
| IMAGE CAPTURING MODE | TV 4  SV 0 | TV 0  SV 0 |
| AF MODE | TV 2  SV 0 | TV 0  SV 0 |

CASE WHERE DIFFERENCE IN EXPOSURE IN IMAGE CAPTURING MODE IS PROVIDED AS DIFFERENCE IN GAIN, AND DIFFERENCE IN GAIN IS REDUCED IN AF MODE

|  | AREA 161 (EV4) | AREA 162 (EV0) |
|---|---|---|
| IMAGE CAPTURING MODE | TV 0  SV 4 | TV 0  SV 0 |
| AF MODE | TV 0  SV 2 | TV 0  SV 0 |

CASE WHERE DIFFERENCE IN EXPOSURE IN IMAGE CAPTURING MODE IS PROVIDED AS DIFFERENCE IN EXPOSURE TIME, AND ALLOCATIONS ARE CHANGED IN AF MODE

|  | AREA 161 (EV10) | AREA 162 (EV0) |
|---|---|---|
| IMAGE CAPTURING MODE | TV 4  SV 0 | TV 0  SV 0 |
| AF MODE | TV 0  SV 4 | TV 0  SV 0 |

CASE WHERE DIFFERENCE IN EXPOSURE IN IMAGE CAPTURING MODE IS PROVIDED AS DIFFERENCE IN BOTH EXPOSURE TIME AND GAIN, AND ALLOCATIONS ARE CHANGED WHILE DIFFERENCE IN EXPOSURE TIME IS REDUCED IN AF MODE

|  | AREA 161 (EV4) | AREA 162 (EV0) |
|---|---|---|
| IMAGE CAPTURING MODE | TV 3  SV 1 | TV 0  SV 0 |
| AF MODE | TV 0  SV 2 | TV 0  SV 0 |

IMAGE CAPTURING APPARATUS AND MONITORING SYSTEM

CROSS-REFERENCE TO RELATED APPLICATIONS

This application is a Continuation of International Patent Application No. PCT/JP2022/004174, filed Feb. 3, 2022, which claims the benefit of Japanese Patent Application No. 2021-028712, filed Feb. 25, 2021, both of which are hereby incorporated by reference herein in their entirety.

BACKGROUND OF THE INVENTION

Field of the Invention

The present invention relates to an image capturing apparatus and a monitoring system.

Background Art

Japanese Patent Application Laid-Open No. 2010-136205 discusses an image capturing apparatus including a solid-state image sensor that divides an imaging plane into a plurality of areas and can control exposure conditions, such as storage time and gain in reading, for each of the areas.

SUMMARY OF THE INVENTION

The present invention is directed to an improvement in accuracy of focal point adjustment in an image capturing apparatus using an image sensor capable of controlling exposure for each area of an imaging plane.

According to an aspect of the present invention, an image capturing apparatus includes an image sensor configured to control an exposure time for each of a plurality of areas and set an exposure time, based on luminance information for each of the plurality of areas in an image captured by the image sensor, one or more processors, and a memory coupled to the one or more processors, the memory storing instructions that, when executed by the one or more processors, cause the one or more processors to determine whether an autofocus mode for adjusting a focus position of an imaging optical system using a contrast evaluation value within an evaluation frame set for the image is enabled, wherein the exposure time is determined for each of the plurality of areas so that, within the evaluation frame, a variance of exposure times of the plurality of areas in a case where the autofocus mode is enabled is smaller than a variance of exposure times of the plurality of areas in a case where the autofocus mode is disabled.

Further features of the present invention will become apparent from the following description of exemplary embodiments with reference to the attached drawings.

BRIEF DESCRIPTION OF THE DRAWINGS

FIG. 1 is a diagram illustrating an image capturing apparatus according to a first exemplary embodiment.

FIG. 5 is a diagram illustrating exposure conditions in the image capturing mode and the AF mode.

DESCRIPTION OF THE EMBODIMENTS

Figure 2A:
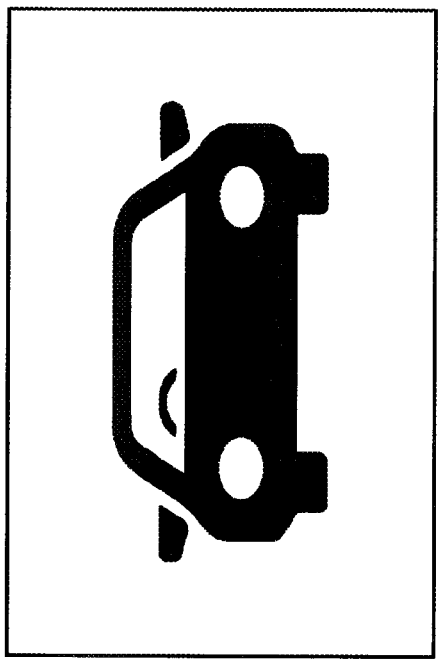
FIGS. 2A and 2B are diagrams illustrating information acquired by preliminary image capturing.

An image capturing apparatus in each exemplary embodiment will be described below with reference to the drawings. Components having the same function are denoted by the same reference numeral in the drawings, and the description thereof will not be repeated.

First Exemplary Embodiment

FIG. 1 illustrates a monitoring system using an image capturing apparatus 100 according to a first exemplary embodiment.

The image capturing apparatus 100 includes an imaging optical system 110 including a focus controlling mechanism 111 capable of changing the focus position, and a solid-state image sensor 120 capable of controlling an exposure condition for each area. The image capturing apparatus 100 further includes a control unit 130 that controls operation of the solid-state image sensor 120, and a transfer unit 140 that transfers an image signal processed by the control unit 130 to outside.

The transfer unit 140 is connected to an external client apparatus 150 via a wired or wireless network. The external client apparatus 150 transmits a control command, such as a change in an image capturing mode or a setting of an autofocus evaluation frame (hereinafter, "AF evaluation frame"), to the transfer unit 140 via the network. Upon receipt of the command, the image capturing apparatus 100 transmits a response to the command to the client apparatus 150. The client apparatus 150 is an external apparatus, such as a personal computer (PC). The client apparatus 150 may be configured to supply power to the image capturing apparatus 100 via the network.

The control unit 130 includes a correction-by-area unit 131, a development processing unit 132, a contrast evaluation value acquisition unit 133, and a luminance information generation unit 134. While FIG. 1 illustrates an example in which the control unit 130 is provided separately from the solid-state image sensor 120, a part or all of the function of the control unit 130 may be included in the solid-state image sensor 120.

The correction-by-area unit 131 generates a main image on which correction has been performed by area, based on an exposure condition by area, from captured-image data of areas varying in exposure condition, acquired by the solid-state image sensor 120. The development processing unit 132 performs development processing, such as white balance, debayer, noise reduction, sharpness, and gamma correction, for the main image on which the correction has been performed by area. There may be adopted a configuration of transferring an image signal to the client apparatus 150 without performing the correction by the correction-by-area unit 131 and the development processing by the development processing unit 132.

In a case where the image capturing apparatus 100 is in an autofocus mode (hereinafter, "AF mode"), the contrast evaluation value acquisition unit 133 acquires a contrast evaluation value within the AF evaluation frame, from the main image generated by the correction-by-area unit 131. As the contrast evaluation value, a generally-used evaluation value, for example, a ratio between maximum luminance and minimum luminance within the AF evaluation frame, may be used. In a case where the image capturing apparatus 100 is in the image capturing mode, the contrast evaluation value acquisition unit 133 is not used.

Figure 2B:
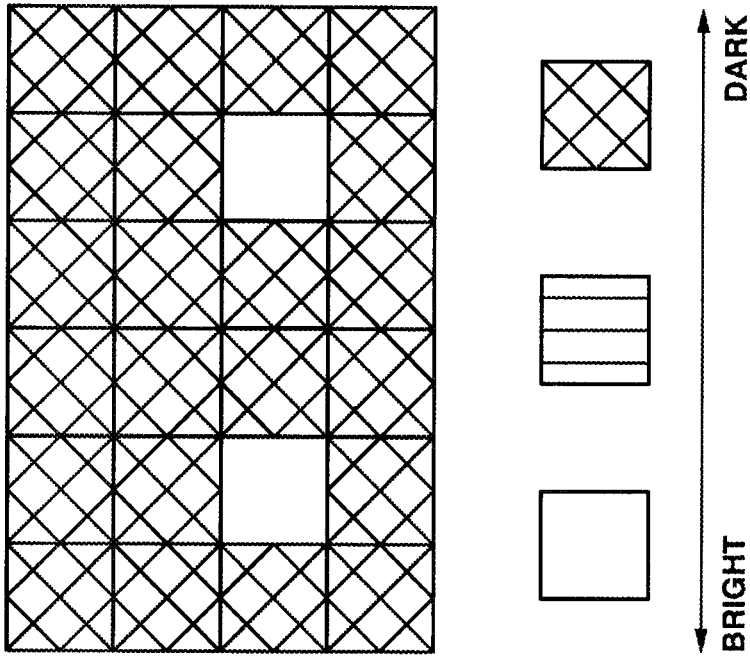

The luminance information generation unit 134 generates luminance information using the main image received from the correction-by-area unit 131, as an input. FIGS. 2A and 2B illustrate the captured main image and an example of the luminance information, respectively. FIG. 2A illustrates the captured main image, which is obtained by imaging a car with headlights turned on at night and has a large luminance difference. FIG. 2B illustrates the luminance information generated by the luminance information generation unit 134.

While FIGS. 2A and 2B illustrate an example in which an area is divided into areas in six columns and four rows, an area division number may be freely set according to an area division number of the solid-state image sensor 120. Similarly, while FIGS. 2A and 2B illustrate an example in which the areas are classified into three levels based on the luminance value of each of the areas, as the luminance information, the number of levels of classification can also be freely set. In the luminance information, as illustrated in FIG. 2B, areas of the body part of the car is dark, and areas illuminated by the headlights are bright.

The exposure condition determination unit 135 determines the exposure condition for each area from the luminance information generated by the luminance information generation unit 134. The image capturing apparatus 100 of the present exemplary embodiment determines the exposure condition for each area so that, within the AF evaluation frame, a variance of exposure time setting values of the plurality of areas in the AF mode is smaller than a variance of exposure time setting values in the image capturing mode. The accuracy of AF can be thereby improved. This will be described below by comparison with a conventional method.

Figure 3A:
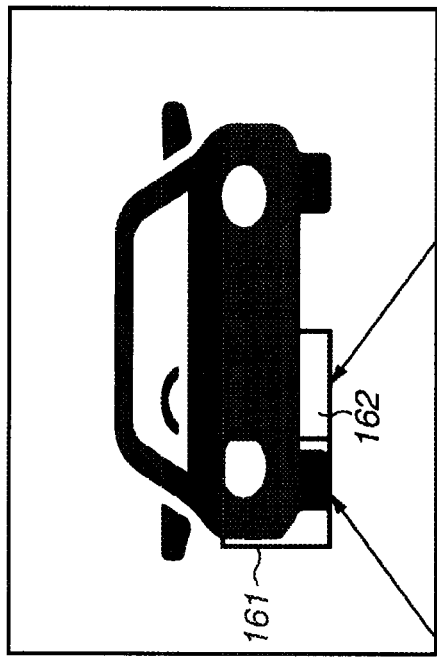
FIGS. 3A and 3B are diagrams each illustrating a contrast evaluation value in an image capturing mode.

In a conventional image capturing apparatus, an exposure condition for each area is determined in an AF mode in the same way as in an image capturing mode. Specifically, a short exposure time is applied to an area for which luminance information indicates brightness and a long exposure time is applied to an area for which luminance information indicates darkness so that each area can be imaged with a correct exposure. FIG. 3A illustrates an image in which each area is imaged with a correct exposure based on the luminance information obtained in FIG. 2B.

Here, the description will be provided with a focus on an area 161 and an area 162 in FIG. 3A. The area 161 is imaged with a short exposure time since a headlight is included in this area, and the area 162 is imaged with a long exposure time since no headlight is included in this area. Therefore, although a part except for the headlight (a body part) in the area 161 and a body part in the area 162 are about equal in terms of luminance value, a signal-to-noise (SN) ratio within the area 161 is poor.

Figure 3B:
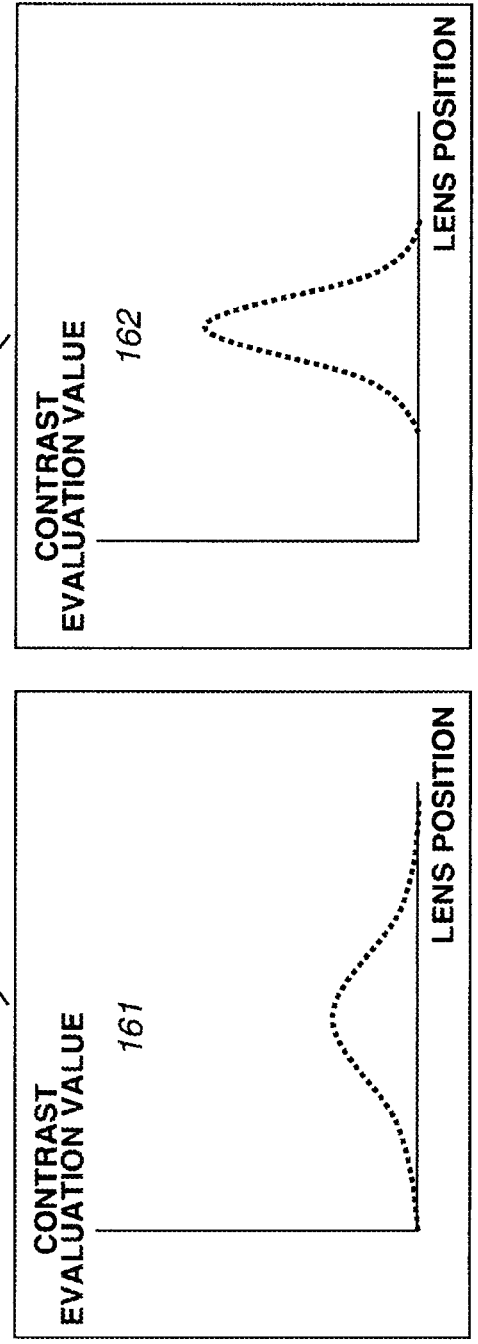

FIG. 3B illustrates a change in the contrast evaluation value of the area 161 and a change in the contrast evaluation value of the area 162 when wobbling drive of a focus lens in the imaging optical system 110 is performed. As illustrated in FIG. 3B, the SN ratio is poorer in the area 161 than in the area 162, and thus the change in the contrast evaluation value due to a change in the position of the focus lens is small. In this way, the way the contrast evaluation value changes is different for each area, and it is therefore difficult to accurately detect a peak of the contrast evaluation value, so that the accuracy of AF decreases.

Figure 4A:
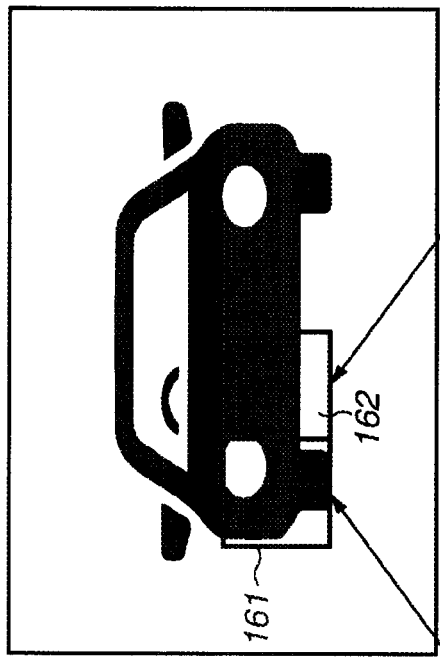
FIGS. 4A and 4B are diagrams each illustrating a contrast evaluation value in an autofocus (AF) mode.

In the present exemplary embodiment, in the image capturing mode, image capturing is performed under the same exposure condition as an exposure condition in FIG. 4A. On the other hand, in the AF mode, the exposure condition for each area is determined so that a difference between the plurality of areas in terms of the exposure time setting value is smaller than a difference in terms of the exposure time setting value in the image capturing mode. FIG. 4A illustrates a case where the difference between the plurality of areas in terms of the exposure time setting value is zero, i.e., the same exposure time is applied to all the areas.

The description will be provided with a focus on an area 161 and an area 162 in FIG. 4A. While the area 161 includes a headlight and the area 162 includes no headlight, these areas are imaged with the same exposure time. Therefore, a part except for the headlight (a body part) in the area 161 and a body part in the area 162 are about equal in terms of the SN ratio.

Figure 4B:
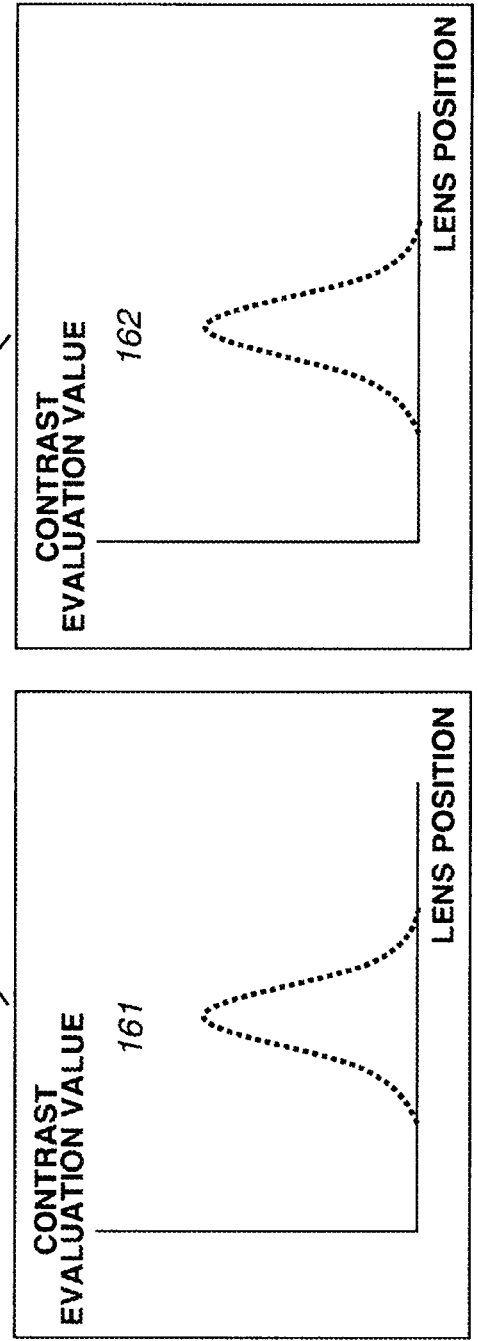

FIG. 4B illustrates a change in the contrast evaluation value of the area 161 and a change in the contrast evaluation value of the area 162 when wobbling drive of the focus lens in the imaging optical system 110 is performed. As illustrated in FIG. 4B, the area 161 and the area 162 are about the same in terms of the SN ratio, and thus are also about the same in terms of the change in the contrast evaluation value due to a change in the focus lens. In this way, the area 161 and the area 162 are imaged with the same exposure time, so that the accuracy of AF can be improved further than in the conventional image capturing apparatus.

Here, FIG. 4A is compared again with FIG. 3A. In FIG. 3A, highlight detail loss in the area of the headlight in the area 161 are inhibited, and thus visibility as a captured image is higher than that in FIG. 4A. However, since the exposure time used for the area 161 and the exposure time used for the area 162 are different to inhibit the highlight detail loss, a difference occurs in the SN ratio between the areas, so that the accuracy of the contrast evaluation value decreases.

On the other hand, in FIG. 4A, since the same exposure time is used for the area 161 and the area 162, the highlight detail loss occurs in the area of the headlight in the area 161, and visibility as a captured image is lower than in FIG. 3A. However, since the same exposure time is used for the area 161 and the area 162, a highly accurate contrast evaluation value can be obtained.

In other words, in the image capturing mode in which the visibility of the captured image is important, image capturing is performed under the condition of FIG. 3A, by which highlight detail losses and blocked-up shadows can be inhibited. On the other hand, in the AF mode in which the accuracy of AF is important, image capturing is performed under the condition in FIG. 4A, by which a highly accurate contrast evaluation value can be obtained. In this way, a setting of the exposure time for each area is switched depending on the mode, so that compatibility between the visibility of the captured image in the image capturing mode and the AF accuracy in the AF mode can be achieved.

While FIGS. 4A and 4B illustrate the case where the area 161 and the area 162 are imaged with the same exposure time, the same exposure time may not be used. Specifically, the exposure time may be set so that, within the AF evaluation frame, the variance of the exposure time setting values of the plurality of areas in the AF mode is smaller than the variance of the exposure time setting values in the image capturing mode. Use of such a setting makes it possible to acquire a more accurate contrast evaluation value in the AF mode than in the image capturing mode.

In other words, the accuracy of AF can be improved further than in the conventional image capturing apparatus using the same setting value for the image capturing mode and the AF mode. However, the SN ratio is larger as the difference in exposure time between the areas is larger, and therefore, it is most desirable that the same exposure time be set for all the areas within the AF evaluation frame in the AF mode.

Here, the exposure time setting value is a setting value for an exposure time defined by what is called a time value (TV), and means that, in a case where the exposure times differ by two times or one-half times, the exposure time setting values vary by one. Therefore, the variance of the exposure time setting values refers to a variance of TVs when the exposure time of each area is expressed by the TV.

Even in the AF mode, the exposure time to achieve the variance smaller than the variance of the exposure time setting values in the image capturing mode may not be used outside the AF evaluation frame. Specifically, even in the AF mode, it is desirable to image each area with a correct exposure as in the image capturing mode, outside the AF evaluation frame. Such a setting makes it possible to inhibit deterioration in the visibility of the captured image outside the AF evaluation frame while improving the AF accuracy in the AF mode, and thus is further desirable.

While the exposure time setting value is described above, a solid-state image sensor that can change gain in reading besides the exposure time can also be used as the solid-state image sensor 120. In this case, it is desirable that, besides the exposure time, analog gain in reading is varied between when in the image capturing mode and when in the AF mode.

The SN ratio is larger as the analog gain is larger. Therefore, the analog gain may be set so that, within the AF evaluation frame, a variance of analog gain setting values of the plurality of areas in the AF mode is smaller than a variance of analog gain setting values in the image capturing mode. In this way, the analog gain is also varied between when in the image capturing mode and when in the AF mode, so that it is possible to achieve compatibility between the visibility of the captured image in the image capturing mode and the AF accuracy in the AF mode. As in the case of the exposure time, the difference in the SN ratio is larger as the difference in the analog gain is larger, and therefore, it is most desirable that the same analog gain be set for the plurality of areas within the AF evaluation frame in the AF mode.

Here, the analog gain setting value is what is called a sensitivity value (SV), and means that, in a case where the analog gains differ by two times or one-half times, the analog gain setting values vary by one. Therefore, the variance of the analog gain setting values refers to a variance of SVs when the analog gain of each area is expressed by the SV.

Further, both the exposure time and the analog gain may be changed. Specifically, the exposure time and the gain may be set so that, within the AF evaluation frame, a variance of sums, each obtained by adding the TV and the SV together, of the plurality of areas in the AF mode is smaller than a variance of sums, each obtained by adding the TV and the SV together, in the image capturing mode. Such a setting makes it possible to achieve compatibility between the visibility of the captured image in the image capturing mode and the AF accuracy in the AF mode.

Furthermore, allocations to the exposure time and the analog gain may be changed while the sum of the TV and the SV remains the same. In a general imaging scene where dark random noise is smaller than photon shot noise, a change in the SN ratio caused by changing the TV by one level is larger than a change in the SN ratio caused by changing the SV by one level. Therefore, the exposure time and the gain may be set so that, within the AF evaluation frame, a differential value obtained by subtracting the SV from the TV in the AF mode is smaller than a differential value obtained by subtracting the SV from the TV in the image capturing mode.

In summary, FIG. 5 illustrates examples of the exposure time setting value (TV) and the analog gain setting value (SV) in each of the area 161 and the area 162. Here, FIG. 5 illustrates a case where the luminance of the area 161 and the luminance of the area 162 are an exposure value (EV) 4 and an EV 0, respectively.

Figure 6:
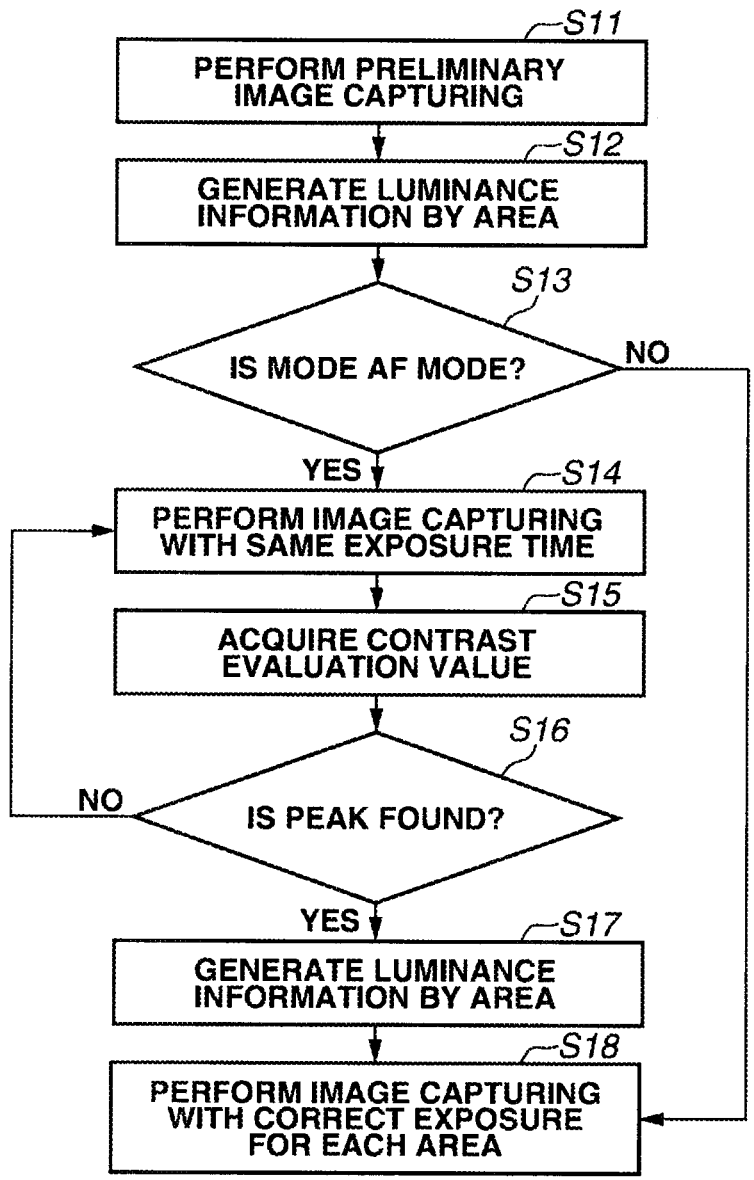
FIG. 6 is a flowchart illustrating switching between the image capturing mode and the AF mode.

FIG. 6 illustrates a flowchart for the image capturing apparatus 100. First, in step S11, the image capturing apparatus 100 performs preliminary image capturing for determining an exposure condition for each area. Next, in step S12, the luminance information generation unit 134 generates luminance information. Subsequently, in step S13, whether the mode is the AF mode is determined. If the mode is the AF mode (YES in step S13), the operation proceeds to step S14. If the mode is the image capturing mode (NO in step S13), the operation proceeds to step S18.

In step S14, the same exposure time is set for a plurality of areas within the AF evaluation frame, and image capturing is performed. In step S15, a contrast evaluation value is acquired from a captured image. The image capturing apparatus 100 repeats step S14 and step S15 while performing wobbling drive of the focus lens in the imaging optical system 110. Subsequently, in step S16, if a focus lens position at which the contrast evaluation value peaks is found (YES in step S16), the focus lens is fixed at the position, and the operation proceeds to step S17.

In step S17, the luminance information generation unit 134 generates luminance information from the captured image acquired as the last frame before the focus lens is fixed. In step S18, image capturing is performed for each area with a correct exposure, using the luminance information generated in step S12 or step S17. In this way, the initial exposure time when shifting to the image capturing mode is determined based on the luminance information generated from the captured image acquired in the AF mode, so that preliminary exposure when shifting to the image capturing mode is unnecessary, which is further desirable.

Second Exemplary Embodiment

An image capturing apparatus 200 according to a second exemplary embodiment has a rough adjustment autofocus mode (rough adjustment AF mode) and a fine adjustment autofocus mode (fine adjustment AF mode), as the autofocus mode. The rough adjustment AF mode is an AF mode for roughly adjusting the focus position of an imaging optical system, and the fine adjustment AF mode is a mode for finely adjusting the focus position of the imaging optical system. The rough adjustment AF mode is a mode for adjusting the focus position to be near the best focus position, and can quickly adjust the focus position to be near the best focus position, in comparison with the fine adjustment AF mode. On the other hand, the fine adjustment AF mode is a mode for finely adjusting the focus position to the best focus position more accurately than in the rough adjustment AF mode, and because of such a characteristic, the moving speed of the focus position is lower therein than in the rough adjustment AF mode. In the AF mode, after AF is performed using the rough adjustment AF mode, the final best focus position is determined by performing AF using the fine adjustment AF mode.

In the fine adjustment AF mode, the exposure time is set so that, within the AF evaluation frame, the variance of the exposure time setting values of the plurality of areas in the AF mode is smaller than the variance of the exposure time setting values in the image capturing mode. However, in the rough adjustment AF mode, within the AF evaluation frame, the variance of the exposure time setting values of the plurality of areas in the AF mode may be larger than or equal to the variance of the exposure time setting values in the image capturing mode.

A case where, in the rough adjustment AF mode, within the AF evaluation frame, the exposure time setting value in each of all the areas in the rough adjustment AF mode is equal to the exposure time setting value in the image capturing mode will be described below as an example. Further, a case where, in the fine adjustment AF mode, the exposure time setting values in all the areas within the AF evaluation frame in the fine adjustment AF mode are identical will be described below as an example.

Figure 7A:
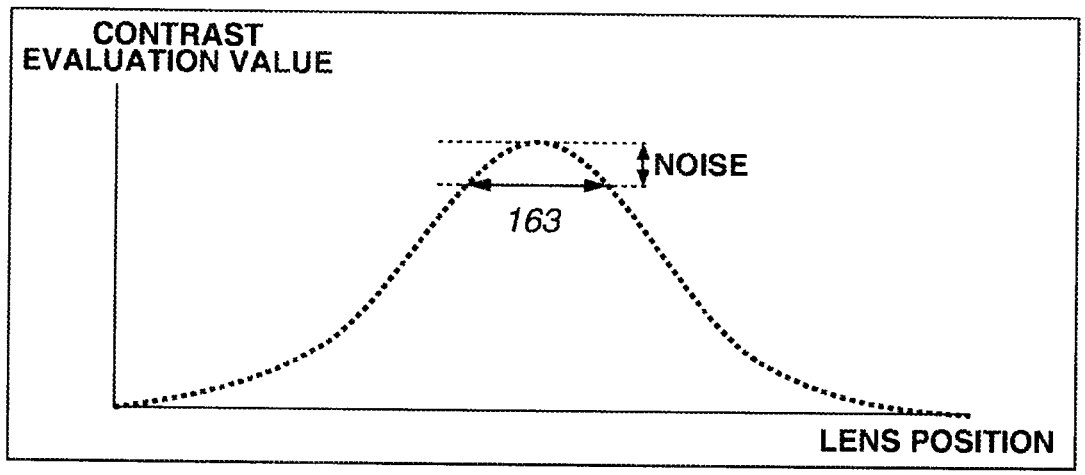
FIGS. 7A and 7B are diagrams illustrating a difference between a rough adjustment AF mode and a fine adjustment AF mode.

FIG. 7A illustrates a change in the contrast evaluation value of the entire AF frame in a case where image capturing is performed under the exposure condition in each of the image capturing mode and the rough adjustment AF mode of the image capturing apparatus 200. Similarly, FIG. 7B illustrates a change in the contrast evaluation value of the entire AF frame in a case where image capturing is performed under the exposure condition in the fine adjustment AF mode of the image capturing apparatus 200.

In FIG. 7A, an area 161 and an area 162 are imaged with different exposure times, and thus a decline in the contrast evaluation value in a case where the focus position is deviated from the best focus position is small. Therefore, when noise in determining the contrast evaluation value is considered, an error 163 occurs in the best focus position in a case where the AF is performed using the evaluation value in FIG. 7A. However, since the area 161 and the area 162 are imaged with different exposure times, the visibility of the captured image is high.

Figure 7B:
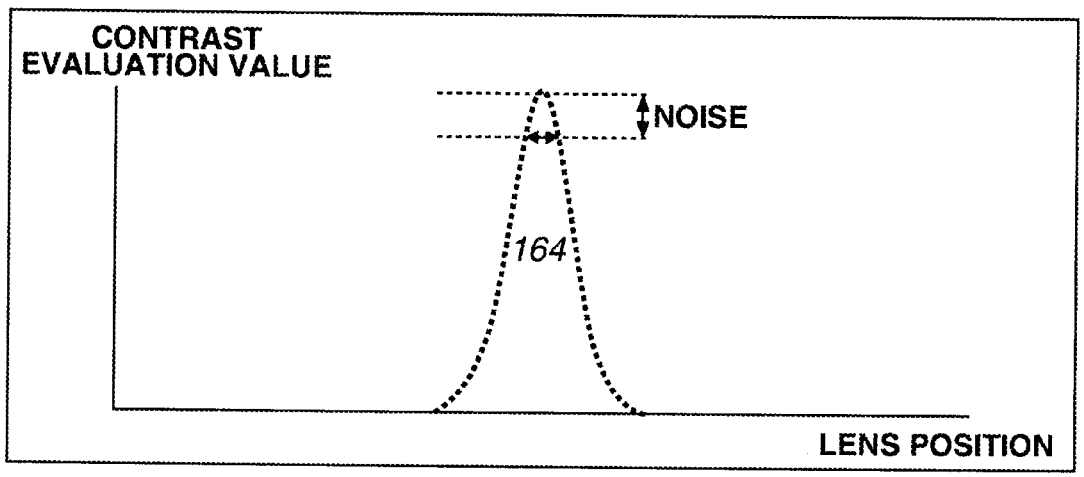

On the other hand, in FIG. 7B, the area 161 and the area 162 are imaged with the same exposure time, and thus a decline in the contrast evaluation value in a case where the focus position is deviated from the best focus position is large. Therefore, in a case where the AF is performed using the evaluation value in FIG. 7B, the error in the best focus position is reduced to an error 164. However, since the area 161 and the area 162 are imaged with the same exposure time, the visibility of the captured image is low.

Therefore, the image capturing apparatus 200 adjusts the focus position to be within the error 163 while inhibiting deterioration in the visibility of the captured image, using the rough adjustment AF mode in which the visibility of the captured image is high. Subsequently, the image capturing apparatus 200 brings the focus position to be within the error 164 using the fine adjustment AF mode in which a highly accurate contrast evaluation value can be obtained. In this way, two types of AF mode are sequentially used, so that it is possible to implement the AF with high accuracy while suppressing the time in which the visibility of the captured image deteriorates, as compared with a case where the autofocus is performed using only the fine adjustment AF mode as in the image capturing apparatus 100 according to the first exemplary embodiment.

Third Exemplary Embodiment

An image capturing apparatus 300 according to a third exemplary embodiment is different from the image capturing apparatus 100 according to the first exemplary embodiment in that gradation compression of a main image is performed in a development processing unit 132. Specifically, the gradation compression is applied with a higher strength in image capturing in the image capturing mode than in image capturing in the AF mode. As the gradation compression, compression may be performed using what is called a gamma curve, or linear compression such as deletion of a lower bit may be used.

As described above, in the AF mode, image capturing is performed while highlight detail losses and blocked-up shadows are accepted to some extent in order to acquire a highly accurate contrast evaluation value. On the other hand, in the image capturing mode, each area is imaged with a correct exposure in order to improve the visibility of the captured image by inhibiting highlight detail losses and blocked-up shadows. Therefore, the dynamic range of the main image corrected by a correction-by-area unit 131 is wider in the image capturing mode than in the AF mode. In other words, in a case where the gradation compression is not performed, the amount of data of the main image in the image capturing mode is larger than the amount of data of the main image in the AF mode.

Typically, the amount of data per unit time that can be transferred to an external client apparatus 150 via a transfer unit 140 is limited by a network band between the transfer unit 140 and the external client apparatus 150. Therefore, it is desirable that the gradation of the main image in the image capturing mode is compressed with a higher strength than the gradation of the main image in the AF mode in order to transfer the same amount of data per unit time.

In this way, in the image capturing apparatus 300, the gradation compression in image capturing in the image capturing mode is applied with a higher strength than the gradation compression in image capturing in the AF mode, so that the amount of data of the main image in the image capturing mode can be about the same as the amount of data of the main image in the AF mode. As a result, latency in network transfer can be reduced, and therefore, such gradation compression is desirable.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:
an image sensor configured to control an exposure time for each of a plurality of areas and set an exposure time, based on luminance information for each of the plurality of areas in an image captured by the image sensor;
one or more processors; and
a memory coupled to the one or more processors, the memory storing instructions that, when executed by the one or more processors, cause the one or more processors to:
determine whether an autofocus mode for adjusting a focus position of an imaging optical system using a contrast evaluation value within an evaluation frame set for the image is enabled,
wherein the exposure time is determined for each of the plurality of areas so that, within the evaluation frame, a variance of exposure times of the plurality of areas in a case where the autofocus mode is enabled is smaller than a variance of exposure times of the plurality of areas in a case where the autofocus mode is disabled.

2. The image capturing apparatus according to claim 1, wherein the exposure time is determined for each of the plurality of areas so that exposure times of the plurality of areas within the evaluation frame are identical in the case where the autofocus mode is enabled.

3. The image capturing apparatus according to claim 1, wherein the exposure time is determined for each of the plurality of areas so that, outside the evaluation frame, a variance of exposure times of the plurality of areas is smaller even in the case where the autofocus mode is enabled than a variance of exposure times of the plurality of areas in the case where the autofocus mode is disabled.

4. The image capturing apparatus according to claim 3, wherein the exposure time is determined for each of the plurality of areas so that, outside the evaluation frame, exposure times of the plurality of areas in the case where the autofocus mode is enabled are identical to exposure times thereof in the case where the autofocus mode is disabled.

5. The image capturing apparatus according to claim 1,
wherein the image sensor can set a gain for each of the plurality of areas based on the luminance information for each of the plurality of areas in the image, and
wherein the gain is determined for each of the plurality of areas so that, within the evaluation frame, a variance of gains of the plurality of areas in the case where the autofocus mode is enabled is smaller than a variance of gains of the plurality of areas in the case where the autofocus mode is disabled.

6. The image capturing apparatus according to claim 5, wherein the gain is determined for each of the plurality of areas so that gains of the plurality of areas within the evaluation frame are identical in the case where the autofocus mode is enabled.

7. The image capturing apparatus according to claim 5, wherein the exposure time and the gain are determined for each of the plurality of areas so that, within the evaluation frame, a variance of sums, each obtained by adding an exposure time and a gain together, of the plurality of areas in the case where the autofocus mode is enabled is smaller than a variance of sums, each obtained by adding an exposure time and a gain together, in the case where the autofocus mode is disabled.

8. The image capturing apparatus according to claim 5, wherein the exposure time and the gain are determined for each of the plurality of areas so that, within the evaluation frame, a variance of differences, each obtained by subtracting a gain setting value from an exposure time setting value, of the plurality of areas in the case where the autofocus mode is enabled is smaller than a variance of differences, each obtained by subtracting a gain setting value from an exposure time setting value, in the case where the autofocus mode is disabled.

9. The image capturing apparatus according to claim 1, wherein the exposure time for each of the plurality of areas when shifting to the autofocus mode is determined based on luminance information of an image acquired in the case where the autofocus mode is enabled.

10. The image capturing apparatus according to claim 1, wherein a rough adjustment autofocus mode and a fine adjustment autofocus mode are included in the autofocus mode, and the focus position is adjusted using the fine adjustment autofocus mode after the focus position is adjusted using the rough adjustment autofocus mode.

11. The image capturing apparatus according to claim 10,
wherein, within the evaluation frame, a variance of exposure times of the plurality of areas in the rough adjustment autofocus mode is larger than or equal to the variance of exposure times of the plurality of areas in the case where the autofocus mode is disabled, and
wherein, within the evaluation frame, a variance of exposure times of the plurality of areas in the fine adjustment autofocus mode is smaller than the variance of exposure times of the plurality of areas in the case where the autofocus mode is disabled.

12. The image capturing apparatus according to claim 11, wherein the exposure time is determined for each of the plurality of areas so that, within the evaluation frame, exposure times of the plurality of areas in the rough adjustment autofocus mode are identical to exposure times of the plurality of areas in the case where the autofocus mode is disabled.

13. The image capturing apparatus according to claim 11, wherein the exposure time is determined for each of the plurality of areas so that, within the evaluation frame, exposure times of the plurality of areas in the fine adjustment autofocus mode are identical to exposure times of the plurality of areas in the case where the autofocus mode is disabled.

14. The image capturing apparatus according to claim 1, wherein the instructions further cause the one or more processors to execute compression processing for gradation of the image with a higher strength in the case where the autofocus mode is disabled than in the case where the autofocus mode is enabled.

15. A monitoring system comprising:
the image capturing apparatus according to claim 1; and
a client apparatus connected via a network.

* * * * *